United States Patent [19]

Newbery et al.

[11] Patent Number: 4,708,054

[45] Date of Patent: Nov. 24, 1987

[54] CREAMING APPARATUS

[75] Inventors: Desmond Newbery; Terry A. Pickford, both of Peterborough, England

[73] Assignee: Baker Perkins PLC, Cambridgeshire, England

[21] Appl. No.: 821,382

[22] Filed: Jan. 22, 1986

[30] Foreign Application Priority Data

Jan. 22, 1985 [GB] United Kingdom ............... 60-0 1556
Nov. 7, 1985 [GB] United Kingdom ..................... 27457

[51] Int. Cl.$^4$ ........................... A21C 9/04; B29F 3/01
[52] U.S. Cl. ................................ 99/450.4; 99/450.7; 118/25; 425/376 B
[58] Field of Search .......................... 99/450.1–450.8; 425/381, 310, 382 R, 376 B; 118/25, 30, 313; 137/625.11, 625.16; 251/207, 208, 304, 345; 222/485, 486, 553, 554

[56] References Cited

U.S. PATENT DOCUMENTS

| 3,340,824 | 9/1967 | Talbot | 99/450.4 |
| 4,162,882 | 7/1979 | Rose | 99/450.4 X |
| 4,469,021 | 9/1984 | Rose et al. | 99/450.4 |
| 4,615,264 | 10/1986 | Rose | 99/450.4 |

Primary Examiner—Timothy F. Simone
Attorney, Agent, or Firm—Steele, Gould & Fried

[57] ABSTRACT

Biscuit creaming apparatus (1) comprises a stencil tube (2) rotatably mounted on a rotatable stencil sleeve (3), the stencil sleeve having spaced-apart outlet ports (5) alignable with discharge orifices (6) in the stencil tube. Alignment can take place with both the tube (2) and sleeve (3) stationary whereby cream supplied to the stencil sleeve is caused to discharge from the discharge orifices of the stencil tube at an angle, (preferably between about 45° and 120°), to the vertical, during air purging operation, such that a tray (47) can easily be placed in position to collect the cream for reuse. Alternatively, alignment with the stencil sleeve (3) stationary and the stencil tube (2) rotatable thereabout, causes cream supplied to the stencil sleeve to discharge downwardly and sequentially from orifices (6) in the stencil tube on to biscuit shells carried by a conveyor band 44.

12 Claims, 10 Drawing Figures

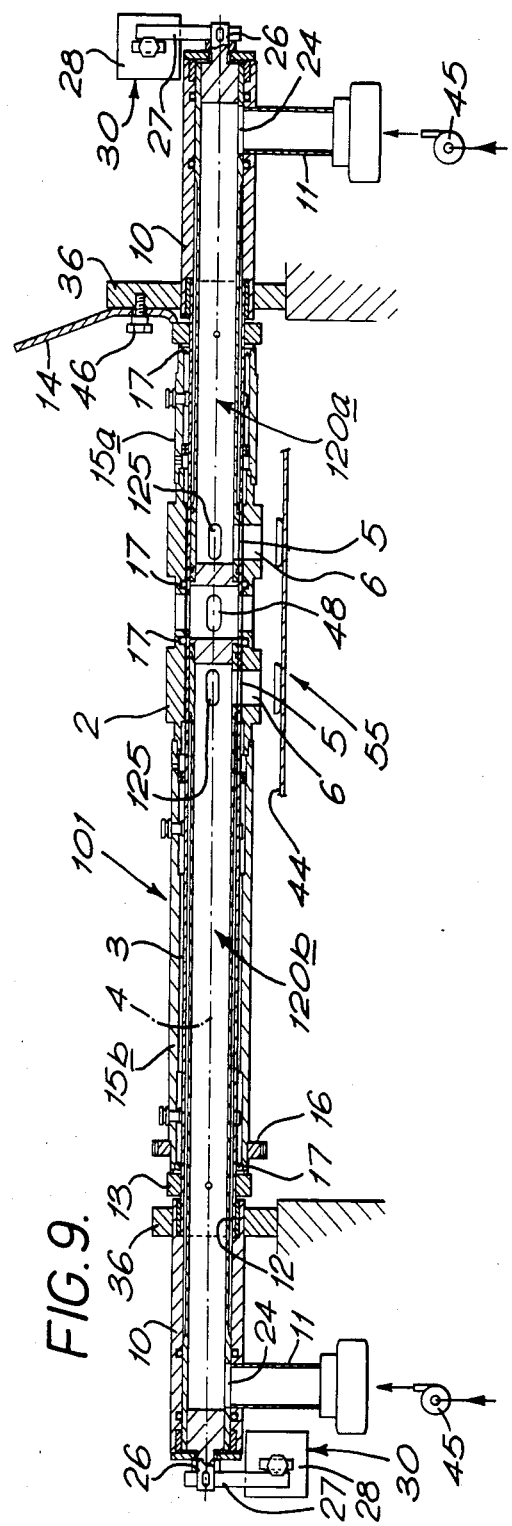
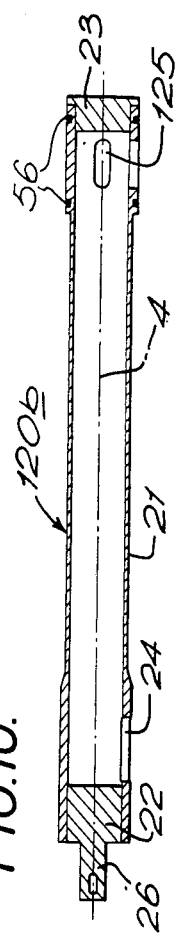
FIG. 9.
FIG. 10.

CREAMING APPARATUS

BACKGROUND OF THE INVENTION

This invention relates to creaming apparatus and has application to sandwiching machines used in the production of biscuit (or cookie, in the United States of America) sandwiches comprising two biscuit shells having a layer of cream or like edible filling (hereinafter collectively called "cream") placed between them.

In known biscuit sandwiching machines, two rows of biscuit shells are carried by conveyors in side-by-side relationship; firstly beneath creaming means which apply cream simultaneously to two biscuit shells, and secondly beneath means for depositing another biscuit shell on top of each creamed shell, thus forming two sandwiches.

One well known form of creaming apparatus comprises a fixed stencil sleeve and a stencil tube rotatably mounted thereon. The stencil sleeve has at least two spaced-apart outlet ports with which downwardly-directed discharge orifices in the stencil tube are alignable as the latter is rotated, whereby cream supplied to the stencil sleeve is discharged sequentially from the stencil tube on to biscuit shells passing beneath in a timed manner.

The cream supply can be fed from both sides of the orifices in the stencil sleeve and valve means provided within the stencil sleeve for controlling the flow of cream through the discharge orifices.

There are times, such as on start-up of a production run, or upon re-start, after a break in operation, when the supply of cream to the stencil tube has to be purged of air so that an uninterrupted discharge of cream can be provided.

Hitherto, purging has been carried out in two separate stages, namely:

Firstly, by use of vent or purging valves disposed in the path(s) of the supply of cream to the apparatus or by disconnecting the supply pipe at a joint. This purges air from those parts of the supply system leading to the valves or stencil.

Secondly, by use of the apparatus as in a production run, whereby biscuit shells are caused to pass beneath the apparatus and cream is deposited on the shells until the deposits remain consistent. The creamed biscuit shells produced up to that time are scrapped.

The prime objects of the invention are to enable purging valves to be dispensed with and to avoid expensive wastage caused by scrapping of incompletely creamed biscuit shells.

SUMMARIES OF THE INVENTION

According to one aspect of the present invention, creaming apparatus comprises a stencil member having discharge orifices and means whereby cream supplied to the stencil member can be discharged from the orifices at an angle to the vertical, for purging purposes, or, alternatively, the cream can be discharged from the orifices in a downward direction, for normal creaming operation.

The creaming apparatus may comprise a stencil tube rotatably mounted on a rotatable stencil sleeve, the stencil sleeve having spaced-apart outlets alignable with discharge orifices in the stencil tube, the arrangement being such that alignment can take place with both the tube and sleeve stationary whereby cream supplied to the stencil sleeve is caused to discharge from the discharge orifices of the stencil tube at an angle to the vertical, for purging purposes, or alternatively, for normal creaming operation alignment with the stencil sleeve stationary and the stencil tube rotatable thereabout, whereby cream supplied to the stencil sleeve is caused to discharge downwardly and sequentially from the stencil tube.

The preferred angle of discharge is between about 45° and 135° to the vertical; preferably 120°.

When purging, using the present invention, the cream is discharged from the orifices such that a receptacle can easily be placed in position to collect the cream.

In the case of known creaming apparatus, purging by downward discharge of cream from the orifices in the stencil tube into a receptacle is not possible as there is insufficient access for placing a receptacle beneath the orifices. Even after purging, surges in pressure of cream supply can occur. Such surges can lead to excessive amounts of cream being discharged onto the biscuit shells when the valve means within the stencil sleeve are operated, so as to open the orifices therein.

It is a further object of the present invention to enable the above-mentioned pressure surge difficulties to be substantially reduced, and thus make it possible to obtain an equalised cream feed at substantially constant pressure to the discharge orifices of the creaming apparatus.

According to another aspect of the present invention, creaming apparatus comprises a stencil sleeve, a stencil tube rotatably mounted on the stencil sleeve, the stencil tube having at least two longitudinally spaced discharge orifices and the stencil sleeve having outlet ports with which the discharge orifices in the stencil tube are alignable, valve means for controlling the flow of cream through the outlet ports, the valve means comprising movable valve members disposed within the stencil sleeve, and means for supplying cream to each valve member, each valve member being operable so that as the associated outlet port is opened or closed, the supply of cream to the valve member is adjusted simultaneously.

The creaming apparatus may be operable whereby, as the outlet ports are closed, the supply of cream to the valve members is interrupted and as the outlet ports are opened, the supply of cream to the valve members is restored.

Alternatively, the creaming apparatus may be operable whereby, as the outlet ports are opened, the supply of cream to the valve members is interrupted and as the outlet ports are closed, the supply of cream to the valve members is restored.

The valve members are preferably of elongate, closed-end tubular form, disposed for rotation within the stencil sleeve and about the longitudinal axis thereof, each valve member having an inlet port alignable with a cream supply source whereby cream is introduced into the interior of the valve member, and an outlet port alignable with an outlet port of the stencil sleeve. Means are provided for causing rotational movement of each valve member whereby synchronized commencement or termination of both the introduction of cream into the interiors of the valve members and the discharge of cream from the discharge orifices in the stencil tube takes place in a controlled manner.

Preferably the rotational movement of the valve members is only partial.

The invention enables the supplies of cream to the discharge orifices to be maintained separate at all times.

The invention also comprises a sandwiching machine provided with the novel creaming apparatus.

The invention further comprises any novel subject matter or combination including novel subject matter herein disclosed.

BRIEF DESCRIPTION OF THE DRAWINGS

An embodiment of the invention will now be described by way of example only, with reference to the accompanying drawings, wherein:

FIGS. 9 and 10 are views similar to those illustrated by FIGS. 1 and 2 respectively and relate to modified creaming apparatus.

In the figures, like reference numerals refer to like features and components.

DETAILED DESCRIPTION OF THE PREFERRED EMBODIMENT

Figures 1, 2:
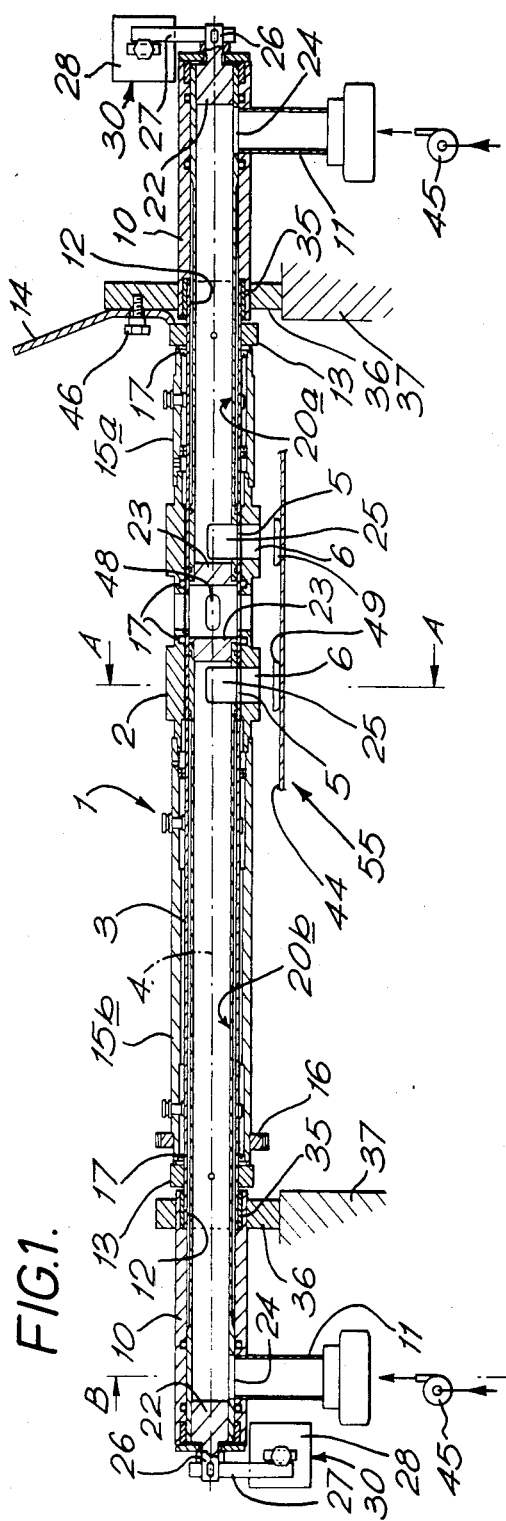
FIG. 1 is a side view, in section, of creaming apparatus.
FIG. 2 is a side view, in section, and to an enlarged scale, of a valve member of FIG. 1, FIGS. 3, 5, 7 and 4,6, 8 are cross-sectional views, to an enlarged scale, taken on lines A—A and B—B respectively of FIG. 1, and illustrate the relative positions of a valve member and associated parts of the creaming apparatus during operation.

With reference first to FIG. 1, creaming apparatus 1 illustrated thereby is used in the production of biscuit sandwiches, each sandwich comprising two biscuit (i.e. cookie) shells with a layer of cream filling between.

The creaming apparatus 1 forms part of a biscuit sandwiching machine which includes a conveyor 55.

The creaming apparatus 1 comprises a normally stationary stencil sleeve 3 and a stencil member in the form of a tube 2 rotatably supported thereon, the sleeve and tube having a common longitudinal axis 4 disposed substantially horiontally.

The ends 12 of the stencil sleeve 3 are rotatably mounted in bearing bushes 35 carried by manifolds 10 which are affixed, by clamping members 36, to the side-frames 37 of a biscuit sandwiching machine (not shown). The stencil tube 2, rotatably surrounding sleeve 3, is connected at its two ends to tubular members 15a, 15b of similar form. At the outer end of the member 15a, i.e. the left-hand end as viewed in FIG. 1, a sprocket 16 is affixed thereto. When the sprocket 16 is rotated by a chain drive (not shown), driven by an electric motor (also not shown), the tubular member 15a causes the stencil tube 2 to rotate around the stencil sleeve 3. Bearings 17 are provided to further support the stencil sleeve 3 during this rotation.

The stencil sleeve 3 is formed with longitudinally spaced-apart outlet ports 5 alignable with longitudinally-spaced groups of discharge orifices 6 formed in the rotatable stencil tube 2. In this example, two groups of orifices 6 are provided, each group comprising three orifices 6 spaced angularly from each other around the tube 2. Valve means are provided for controlling the flow of cream through the ports 5 and orifices 6 when they are suitably aligned.

The valve arrangement ensures that the supplies of cream to the discharge orifices is kept separate at all times.

The valve means comprise two tubular members 20a and 20b which are disposed in tandem within the stencil sleeve 3. The valve members are essentially of the same form, the only difference being in their length. The reason for this difference is that in a biscuit sandwiching machine handling four side-by-side rows of biscuit shells, two creamer apparatuses would be used, one disposed behind the other in the direction of conveyance of the biscuit shells, with the cream discharge orifices arranged a few centimetres above the path of each row, two either side of a center line of the upper run of the conveyor belt 41.

Because valve members 20a and 20b are the same, apart from their length, only one will be described. Referring to FIG. 2, valve member 20b is illustrated thereby, and comprises a tube 21 closed at each end by plugs 22 and 23, and having a cream inlet port 24 and a cream outlet port 25. The plug 22 has an axially-extending end portion 26 for coupling to a valve member actuating means 30. The inlet port 24 is alignable with an associated cream supply duct 11 leading to the manifold 10. The outlet port 25 is alignable with the associated outlet port 5 and discharge orifice 6 in the sleeve 3 and tube 2 respectively. The port 24 is oval-shaped, having a width extending over about 20° (see FIG. 4). On the other hand, the port 25 is much larger, and can be viewed as formed by removal of a sizeable segment, (about 180° in "width"), from the wall of the valve member 20a. (See FIG. 3). The valve member carries annular seals 56.

The actuating means 30 comprises a pneumatic piston and cylinder unit 28, the piston of which is coupled by a link 27 to the end portion 26 of valve 20b whereby it can be semi-rotated about its longitudinal axis 4, to simultaneously open or close its ports 24 and 25. As explained hereinafter, valve 20b is thus operable so that as the associated outlet port 25 is opened or closed, the supply of cream to the valve member is adjusted simultaneously, in a synchronized manner.

The arrangement results in the synchronized commencement or termination of both the introduction of cream into the interiors of the valve members 20a, 20b and the discharge of cream from the discharge orifices 6 in the stencil tube 2 in a controlled manner.

Figures 3, 4:
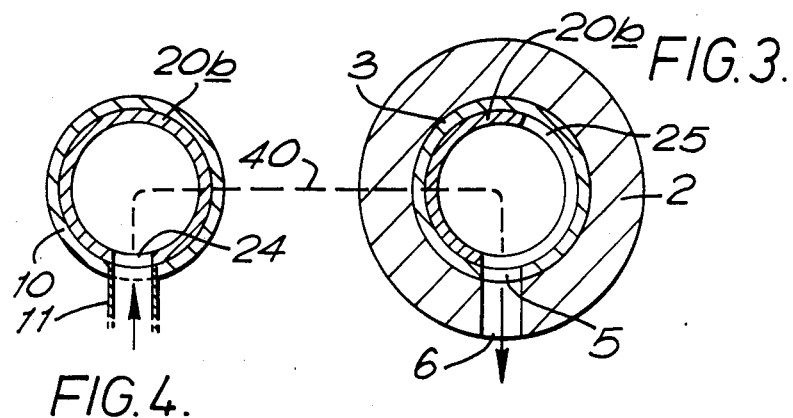
Figures 5, 6:
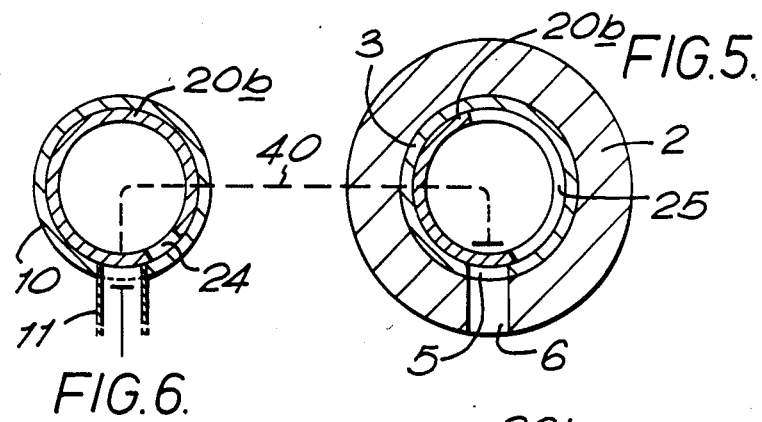
Figures 7, 8:
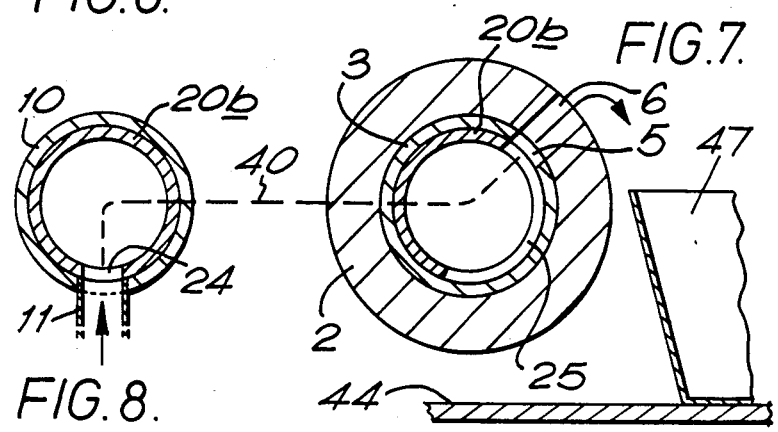

FIGS. 3, 5 and 7 illustrate the relative position of the various parts of the apparatus 1 at the cream discharge end of the valve member 20b whereas FIGS. 4, 6 and 8 illustrate the relative position of the various parts of the apparatus 1 at the cream inlet end thereof.

FIGS. 3 and 4 should be viewed together. Similarly, FIGS. 5 and 6, and likewise, FIGS. 7 and 8.

As shown in FIGS. 1, 2, 3 and 4, in the normal, i.e. bisucit creaming mode of the apparatus 1, the cream is supplied to the ducts 11 disposed at opposite ends of the apparatus 1 by way of pumps 45.

The cream enters the inlet port 24 (FIG. 4) of valve member 20b to pass along the interior of the valve member, as indicated by the arrow 40, to the outlet port 25, (FIG. 3), and thence to the aligned outlet port 5 in the stencil sleeve 3.

As the stencil tube 2 is a discharge orifice 6 in the stencil tube the sprocket 16, each time a discharge orifice 6 in the stencil tube is brought into common alignment with the associated stationary outlet ports 25 and 5, a portion of cream is sequentially deposited on each biscuit shell 49 being conveyed beneath the creaming apparatus 1, in close proximity thereto.

With reference to FIGS. 5 and 6, by partial rotation, (about 22°), of the valve member 20b, employing the associated actuating means 30, the inlet port 24 of the valve member is moved out of alignment with the discharge end of the cream supply duct 11. This terminates the supply of cream to the interior of the valve member 20b. Substantially simultaneously, with this interruption of the cream supply, the valve members outlet port 25 is moved out of alignment with the associated outlet port 5 in the stencil sleeve 3, this closure preventing cream leaving the interior of the valve member 20b by way of the outlet port 25.

This partial rotation of the valve member 20b, (and similarly of the valve member 20a), is carried out as required at the end of a production run, or, as and when it is necessary to temporarily interrupt a production run.

By closing-off the inlet port 24 of the valve member 20b in this manner, pressure surges in the cream being pumped to the creaming apparatus 1 are confined to the supply duct 11. Thus these surges do not affect pressure of the cream remaining within the valve member 20b.

Partial rotation of the valve member 20b in a reverse direction, restoring it to its original position, causes the outlet port 25 to re-align itself with the associated outlet port 5 and the inlet poort 24 to re-align itself with the associated duct 11. Thus the supply of cream to the valve member is restored.

The normally stationary stencil sleeve 3 can be semi-rotated for cream purging purposes. With reference once more to FIG. 1, the stencil sleeve 3 is provided at its right-hand end with a collar 13 secured to its exterior. A lever 14 is attached to the collar 13 whereby, after removal of a locking bolt 46 from a recess in member 36, angular movement of lever 14 (about axis 4), causes rotation of the stencil sleeve 3. This rotation allows the outlet ports 5, and, by angular adjustment of the tube 2, using the sprocket 16, the ports 5 and discharge orifices 6, to be aligned in positions whereby cream can be discharged at an angle to the vertical for air-purging purposes. (See FIGS. 7 and 8). The valve member 20b remains in its normal, i.e. creaming, position during air-purging. The preferred angle of discharge is between about 45° and 135°, and preferably 120°. The sleeve 3 can be locked in the purge position, using the bolt 46, which is locatable in another recess in the same member 36.

FIGS. 7 and 8 illustrates how purging is carried out. With the stencil sleeve 3 rotated through 120°, the outlet ports 5, 25 and discharge orifices 6 can be suitably positioned whereby cream is discharged laterally, at an angle of about 120° to the vertical. A portable tray 47 is used to collect the purged cream.

As in the case of known apparatus, purging by downward discharge of cream from the orifices 6 in the stencil tube 2 into a receptable is not possible as there is insufficient access for placing the receptable beneath the orifices, due to the close proximity of the conveyor belt 44.

Cream is now pumped into the apparatus 1, so as to fill the interior thereof and to expel air therefrom. When all the air has been purged, i.e. when cream is flowing continuously from the discharge orifices 6, pumping is stopped and the stencil sleeve 3 is restored to its original position, and re-secured. The tray 47 is then removed.

The apparatus 1 is now ready for normal, i.e. creaming operation.

A ring of vent ports 48 is formed in the wall of the stencil sleeve 3, between adjacent ends of the valve members 20a, 20b. The ports 48 prevent build-up of any cream leaking past the valve members.

With reference now to FIGS. 9 and 10, a modified creaming apparatus 101 is illustrated thereby. The only structural difference between the creaming apparatus 1 of FIGS. 1 to 8, and the modified creaming apparatus 101 of FIGS. 9 and 10, is in the form of valve members 120a and 120b.

Valve members 120a and 120b are identical to valve members 20a and 20b except for the use of oval-shaped outlet ports 125 by the former. The outlet ports 125 are of similar size to the inlet ports 24.

Operation of the valve members 120a and 120b is different also. Using valve member 120b as an example, although it too is operable so that as the associated outlet port 125 is opened or closed, the supply of cream to the valve member is adjusted simultaneously in a synchronized manner, the valve member 120b is employed to give a different effect.

In operation of the valve member 120b, (and similarly the valve member 120a), cream is fed to the associated cream supply duct 11 by the pump 45 as before. By partial rotation of the valve member 120b, so as to bring into alignment the cream inlet port 124 with the cream supply duct 11, the cream can pass into the interior of the valve member. By further rotation of the valve member 120b, the cream outlet port 125 thereof is brought into alignment with the associated outlet 5 of the stencil sleeve 3 and discharge orifice 6 of the stencil tube 2. The cream can then flow onto the biscuit shells being conveyed beneath the creaming apparatus 101. Rotation of the valve member 120b so as to bring the cream outlet port 125 into its discharge position simultaneously closes off the cream inlet port 124 from the cream supply duct 11.

Thus each valve member 120a, 120b is operable so that as the associated outlets ports 5 are opened, the supply of cream to the valve members is interrupted, i.e. terminated. Also, as the outlet ports 5 are closed, the supply of cream is restored.

As before, the arrangement ensures any pressure surges in the ducts 11 are not transmitted through the cream present in the valve members 120a, 120b.

The stencil sleeve 3 can be semi-rotated for cream purging purposes as described above with reference to FIGS. 1, 7 and 8.

In a non-illustrated modification, an inlet port 24 and/or the discharge end of a duct 11 is provided with means for finely adjusting the flow of cream into the apparatus 1. Such means may comprise a movable plate or "shoe", the position of which imposes a relatively small or relatively large throttling effect on cream flow, depending on requirements.

The valve means is also simple and positive in operation, and can easily be removed for cleaning purposes. Furthermore, and most importantly, the valve means substantially reduce a problem long inherent in creaming apparatus, namely variation in pressures of cream feed on start-up, which variations can lead to undesirable surges, resulting in considerable waste of cream and unacceptable biscuit sandwiches that have to be scrapped.

The belt-type conveyor 55 could be replaced by any other conveyor of suitable form. For example, a flighted pusher conveyor.

We claim:
1. A creaming apparatus, comprising:
a stencil member having at least one cream discharge orifice; and, cream channeling means moveable between: a creaming position, wherein cream is discharged downwardly from the at least one orifice for application to products passing beneath the stencil member; and, an air purging position, wherein cream is discharged at an angle from vertical from the at least one orifice for collection at a position to one side of the stencil member, whereby cream discharged during air purging may be easily collected for reuse.

2. A creaming apparatus as claimed in claim 1, wherein the cream channeling means comprises a stencil sleeve member, mounted coaxially with and interiorly of the stencil member, and rotatable between the creaming and air purging positions, the stencil sleeve member having at least one cream inlet and at least one cream outlet, the at least one outlet being successively rotatably alignable with the at least one discharge orifice.

3. A creaming apparatus, comprising:
a stencil sleeve having spaced-apart outlet ports and rotatably mounted for movement between a creaming position and an air purging position; and,
a stencil tube having discharge orifices and rotatably mounted over the rotatable stencil sleeve, the outlet ports and discharge orifices being alignable with one another during creaming and air purging operations: wherein during creaming the stencil sleeve is stationary in the creaming position and the stencil tube rotates thereabout, cream being sequentially discharged downwardly from the stencil tube; and, wherein during air purging the stencil sleeve is stationary in the air purging position and the stencil sleeve is stationary, cream being discharged at an angle from vertical from the stencil tube for collection at a position to one side of the stencil tube,
whereby cream discharged during air purging may be easily collected for reuse.

4. A creaming apparatus as claimed in claim 3, wherein the angle of discharge during air purging is between about 45 degrees and 135 degrees to the vertical.

5. A creaming apparatus, comprising:
a stencil sleeve having spaced-apart outlet ports and rotatably mounted for movement between a creaming position and an air purging position;
a stencil tube having discharge orifices and rotatably mounted over the rotatable stencil sleeve, the outlet ports and discharge orifices being alignable with one another during creaming and air purging operations: wherein during creaming the stencil sleeve is stationary in the creaming position and the stencil tube rotates thereabout, cream being sequentially discharged downwardly from the stencil tube; and, wherein during air purging the stencil sleeve is stationary in the air purging position and the stencil sleeve is stationary, cream being discharged at an angle from vertical from the stencil tube for collection at a position to one side of the stencil tube;
valve means for controlling the flow of cream through the outlet ports, the valve means comprising a pair of moveable valve members; and,
means for supplying cream to each valve member, each valve member being operable to adjust the supply of cream thereto simultaneously with the respective outlet port being opened and closed, whereby cream discharged during air purging may be easily collected for reuse and pressure surges in the valve members can be prevented.

6. A creaming apparatus according to claim 5, wherein the valve members comprise elongate, closed-end tubular forms disposed for rotation within the stencil sleeve and about the longitudinal axis thereof, each valve member having an inlet port alignable with a cream supply source whereby cream is introduced into the interior of the valve member and each valve member having an outlet port alignable with an outlet port of the stencil sleeve.

7. A creaming apparatus as claimed in claim 6, further comprising means for causing rotational movement of each valve member, whereby synchronized commencement and termination of both the introduction of cream into the interiors of the valve members and the discharge of cream from the discharge orifices in the stencil tube take place in a controlled manner.

8. A creaming apparatus, comprising:
a stencil sleeve haivng a spaced-apart outlet ports and rotatably mounted for movement between a creaming position and an air purging position;
a stencil tube having at least two longitudinally spaced discharge orifices and rotatably mounted over the rotatable stencil sleeve, the outlet ports and discharge orifices being alignable with one another during creaming and air purging operations;
valve means for controlling the flow of cream through the outlet ports, the valve means comprising moveable valve members disposed within the stencil sleeve; and,
means for supplying cream to each valve member, each valve member being operable, as its respective outlet port is opened and closed, to simultaneously adjust the supply of cream to the valve member,
whereby cream may be discharged during air purging for collection and reuse and pressure surges in the valve means can be prevented.

9. A creaming apparatus as claimed in claim 8, wherein the valve members are operable to interrupt the supply of cream to the valve members as the outlet ports are closed and operable to restore the supply of cream to the valve members as the outlet ports are opened.

10. A creaming apparatus as claimed in claim 8, wherein the valve members are operable to interrupt the supply of cream to the valve members as the outlet ports are opened and operable to restore the supply of cream to the valve members as the outlet ports are closed.

11. A creaming apparatus as claimed in claim 8, wherein the valve members comprise elongate, closed-end tubular forms disposed for rotation within the stencil sleeve and about the longitudinal axis thereof, each valve member having an inlet port alignable with a cream supply source whereby cream is introduced into the interior of the valve member and each valve member having an outlet port alignable with an outlet port of the stencil sleeve.

12. A creaming apparatus as claimed in claim 11, further comprising means for causing rotational movement of each valve member, whereby synchronized commencement and termination of both the introduction of cream into the interiors of the valve members and the discharge of cream from the discharge orifices in the stencil tube take place in a controlled manner.

* * * * *